(12) United States Patent
Ausmeier et al.

(10) Patent No.: US 10,344,163 B2
(45) Date of Patent: Jul. 9, 2019

(54) CUSHION-LIKE SHAPED BODY AND USE THEREOF

(71) Applicant: TechnoGel GmbH, Duderstadt (DE)

(72) Inventors: Matthias Ausmeier, Osterode am Harz (DE); Hans Hermann Dreyling, Duderstadt (DE); Jan Klingebiel, Duderstadt (DE); Frank Stefan Klingebiel, Duderstadt (DE)

(73) Assignee: TECHNOGEL GMBH, Duderstadt (DE)

( * ) Notice: Subject to any disclaimer, the term of this patent is extended or adjusted under 35 U.S.C. 154(b) by 392 days.

(21) Appl. No.: 14/763,233

(22) PCT Filed: Jan. 23, 2014

(86) PCT No.: PCT/EP2014/000165
§ 371 (c)(1),
(2) Date: Jul. 24, 2015

(87) PCT Pub. No.: WO2014/114453
PCT Pub. Date: Jul. 31, 2014

(65) Prior Publication Data
US 2015/0368465 A1    Dec. 24, 2015

(30) Foreign Application Priority Data

Jan. 24, 2013  (DE) .................... 10 2013 001 169

(51) Int. Cl.
*C08L 75/04* (2006.01)
*C08J 7/04* (2006.01)
(Continued)

(52) U.S. Cl.
CPC .............. *C08L 75/04* (2013.01); *A47C 7/029* (2018.08); *A47C 27/085* (2013.01); *C08J 7/047* (2013.01); *A61G 7/07* (2013.01); *Y10T 428/239* (2015.01)

(58) Field of Classification Search
CPC ................................. C08L 75/04; C08J 7/047
See application file for complete search history.

(56) References Cited

U.S. PATENT DOCUMENTS 4,992,312 A    2/1991   Frisch
5,147,725 A *  9/1992   Pinchuk ................. A61L 27/34
                                              427/387

(Continued)

FOREIGN PATENT DOCUMENTS

CN    101341007 A    1/2009
CN    101400409 A    4/2009
(Continued)

*Primary Examiner* — Scott R. Walshon
*Assistant Examiner* — Jasper Saberi
(74) *Attorney, Agent, or Firm* — W & C IP (57) ABSTRACT

A cushion-like shaped body (1) having an elastic, gel-like filling (2) in a thin-walled outer layer (3) are frequently used as seals, cushions, vibration dampers or shape compensation materials. This shaped body (1) is to be able to withstand severe strains, distortions, compressions and flexural forces, both in the event of brief severe stress and in the event of prolonged stress. For this purpose, the cushion-like shaped body (1) has a filling (2) of a polyurethane having Shore 000 hardness less than or equal to 80 and a compression set less than or equal to 14%, and this filling (2) is present within a shell having an outer layer (3) of a soft silicone material having a layer thickness of 0.075 to 1 mm and a Shore A hardness between 3A and 45A. Such a shaped body (1) is able to return to its original form without lasting elongation after tensile strain at room temperature up to 250%. There is no formation of cracks, detachment phenomena, bubbles, (Continued)

folds or other lasting damage. The elongation does not cause visible detachment between filling (2) and outer layer (3).

12 Claims, 11 Drawing Sheets

(51) Int. Cl.
  *A47C 27/08* (2006.01)
  *A47C 7/02* (2006.01)
  *A61G 7/07* (2006.01)

(56) References Cited

U.S. PATENT DOCUMENTS

| | | | |
|---|---|---|---|
| 5,884,624 A * | 3/1999 | Barnett | A61M 16/06 128/206.14 |
| 8,232,364 B2 | 7/2012 | Hoffman et al. | |
| 2007/0066788 A1 * | 3/2007 | Hoffmann | C08G 18/10 528/49 |
| 2007/0221227 A1 * | 9/2007 | Ho | A61M 16/06 128/206.24 |
| 2007/0246157 A1 | 10/2007 | Mason et al. | |
| 2009/0320297 A1 * | 12/2009 | Segeren | B25G 1/10 30/45 |
| 2011/0088699 A1 | 4/2011 | Skipper et al. | |
| 2012/0090197 A1 | 4/2012 | Wyner et al. | |

FOREIGN PATENT DOCUMENTS

| | | |
|---|---|---|
| DE | 20217653 U1 | 4/2004 |
| DE | 69634431 T2 | 5/2006 |
| DE | 102007057091 A1 | 6/2008 |
| DE | 202010016838 U1 | 9/2011 |
| DE | 20 2010 016 838 U1 | 11/2011 |
| EP | 0396230 B1 | 11/1990 |
| EP | 1142943 A2 | 10/2001 |
| EP | 202012016838 U1 | 11/2011 |
| JP | 2-277634 A | 11/1990 |
| JP | 10-508786 A | 9/1998 |
| JP | 3143010 U | 6/2008 |
| JP | 2009-507969 A | 2/2009 |
| JP | 2009-520606 A | 5/2009 |
| JP | 2009-540870 A | 11/2009 |
| JP | 2011-502657 A | 1/2011 |
| WO | 2010009877 A1 | 1/2010 |

* cited by examiner

CUSHION-LIKE SHAPED BODY AND USE THEREOF

CROSS REFERENCE TO RELATED APPLICATIONS

This application is a National Stage Application based on the International Application No. PCT/EP2014/000165 filed Jan. 23, 2014 which claims priority to German Application 10 2013 001 169.8 filed Jan. 24, 2013. The complete contents thereof are herein incorporated by reference.

FIELD OF THE INVENTION

The invention relates to a cushion-like shaped body, which comprises an elastic filling, preferably a gel, in an enclosure, and to the use of the shaped body inter alia for pads, grips, saddles, cushions, seals and vibration dampers, including within more complex components and articles in which the cushion is integrated, on which it is integrally formed or to which it is connected.

BACKGROUND OF THE INVENTION

Gel cushions as seals or pads have long been known. They are used for example in the case of bicycle saddles, cushions and seats for uniform load distribution or are used in respiratory masks of a medical or industrial kind in the sealing and padding area that is up against the user's face.

These seals and pads are intended to be soft, elastic and pliable. It is usually desired that, after compressive loading during use, they revert to their original shape, in order to be able to perform their function again in the same way the next time they are used.

Elastic and gel-like materials have been found to be very well suited for padding and sealing materials, which are intended to produce a pleasing, softly padded feel for the user and at the same time provide a good permanent sealing effect by a certain elasticity and restoring force. Silicones and polyurethanes are used to a great extent.

The utility model DE 202 17 653 U1 discloses a gel body of a soft silicone gel that is surrounded by an outer skin of silicone or PU film and is connected to a carrier part by way of a harder intermediate part.

DE 696 34 431 T2 describes inter alia a facial seal for a respiratory mask comprising an annular sealing part of a viscoelastic polyurethane polymer with an elasticity similar to human fat tissue and a covering of the otherwise tacky polymer by a urethane film that is possibly thermoformed or applied by spraying or dipping. At 0.05 to 0.25 mm, this covering film is kept very thin in order not to change the elastic properties of the annular sealing body.

Elastic polyurethanes offer mechanical properties that can be set very well for the intended use. An inherent tackiness often necessitates a covering film, as described above. The film is intended to be thin and tear-resistant, but not obtrusive in use. This problem has not yet been fully solved in the prior art. There are many polyurethane compounds that cannot be replicated in their elastic and shape-changing behavior by the film surrounding them.

As a thin sprayed film, the aforementioned polyurethane covering film is capable of adapting itself under compressive loading to any movement of the viscoelastic polyurethane, but this does not apply to tensile loads. They may cause the film to tear. Sufficiently flexible PVC films contain too much plasticizer, with the accompanying disadvantages. Polyurethanes are generally incompatible with silicones, which are also used as release agents, so that detachments may occur at the interface.

SUMMARY

The object of the invention is to form a soft, dimensionally stable gel body, which can be used for example as a pad or seal and consists of an enclosed filling, in a uniformly flexible and dimensionally stable manner, it being intended that these properties are provided even under tensile, crushing or torsional loads.

The shaped body takes the form of a unit comprising a filling and an enclosure. The enclosure consists entirely or partially of a thin enclosing layer of soft silicone that is capable of following every movement of the filling, and vice versa. As a result, the enclosing layer is scarcely perceptible visually or noticeable by feel. The cushion behaves like a single body. Even after compressive or extensive strain, no tears, blisters, crinkles, folds, detachments or other permanent forms of damage occur. In this way, as long as the filling is surrounded by the thin silicone enclosing layer, the shaped body forms a soft, elastic, extensible and compressible, but also dimensionally stable body that has a very uniform effect and can be formed in a wide variety of shapes.

Preferably more than 5%, more preferably more than 10% and in particular more than 20% of the enclosure with respect to the contact surface area with respect to the filling is formed by the enclosing layer of silicone. A low degree of enclosure with the soft silicone enclosing layer may be provided for example in the case of shape-compensating cushions. The filling is located for example in a gap between two bodies and the enclosing layer covers the filling completely on the outside, and completes the enclosure of the elastic filling or gel filling, i.e. here the compensating compound.

In certain embodiments, parts of the enclosure may be formed by rigid elements on which the cushion-like shaped body is integrally formed. In turn, the thin, soft silicone enclosing layer completes the enclosure of the elastic filling.

The shaped body may for example have the form of a cushion and be suitable for use as a cushion or pad, for example for orthopedic articles, such as prostheses or ortheses, in order to be used in those cases for a wide variety of padding functions. The shaped body may also be formed in almost any other desired outer shape, including as a grip, for example for sports equipment or medical equipment, including bicycle handlebar grips, dumbbell handle regions, etc., and may be used for seat cushions, armrests, head restraints, saddles, loose cushions of all kinds, lumbar pads, for medical ports, for erotic articles, for seals, for example including on medical articles or sanitary articles, for example seals for emergency respiratory masks, anesthesia masks or intubation devices, and finally also as vibration dampers for machines and in particular motor vehicles.

A wide variety of components or articles can be equipped with the cushion-like shaped body according to the invention, for example medical or orthopedic articles or sanitary articles, as already described above. The shaped body according to the invention may in this case be combined with more complex components or articles, for which it may for example have been made to fit in a clearance in the component or article. Alternatively or in addition, fastening and holding elements may be arranged, i.e. fastened, in particular integrally formed and especially molded, on the shaped body according the invention. In special embodiments, parts of the enclosure of the shaped body may be formed as component elements or fastening or holding elements. The enclosure may also be formed in one piece with other parts of the component or article. The enclosing layer may form with component elements, for example hard-plastic segments, a volume for filling.

Among the prerequisites for achieving the object is that the enclosure has a very high extensibility and tear resistance but at the same time great softness. Investigations carried out by the inventors have found that this cannot be achieved in practice with prefabricated, thermoformed films. The processing of the films has the effect that the enclosure is possibly oriented or stretched, which although it makes the film tear-resistant, makes it less adaptable.

The following is essential for the invention:
The enclosure is highly extensible, the ultimate elongation is preferably not less than 400% more preferably not less than 500%;
the extensibility of the polyurethane is always greater than or equal to the extensibility of the silicone skin. As a result, the polyurethane follows every movement of the silicone skin, no detachments occur; the polyurethane body is not mechanically damaged or altered under extension;
at the same time, under longitudinal extension the enclosure develops relatively high restoring forces, it is therefore not only soft, but highly elastic and assists the filling in its own elastic recovery, which has the effect that the entire shaped body behaves as if it were cast from one material. In order to achieve this, the silicone layer of the enclosure has a tensile stress at an elongation of 250% of at least 0.5 N/mm$^2$;
the polyurethane is a preferably undercrosslinked polyaddition product of isocyanate and an isocyanate-reactive component. The isocyanate-reactive component is present in excess and lends the material a certain internal mobility along with the dimensional stability and elasticity given by the crosslinking. The "internal mobility" may be brought about by the sliding of molecular regions or polymer domains in relation to one another or by the relative mobility of a non-steady-state gel phase with respect to a steady-state gel phase, and lends the polyurethane a gel character. The polyurethane used according to the invention, which forms the cushion filling, has a Shore (000) hardness of no more than 80, preferably no more than 50, more preferably no more than 25. The polyurethane filling material is adhesive.

It has surprisingly been found that the shaped body according to the invention behaves completely homogeneously. The presence of the enclosure is not visually apparent from the outside. No displacement takes place at the interface between the enclosure and the filling material. No blisters or other irregularities occur even under great mechanical loading. The soft silicone rubber makes the entire cushion feel soft and gives it a pleasant feel. At the same time, the cushion is so soft that customary ball tests, such as are carried out in the case of foam, do not lead to meaningful test results. The cushion as a whole is very elastic, i.e. it quickly reverts to its original shape. The silicone skin is highly reversibly extensible and takes the filling along with it in every phase of the mechanical loading. With tensile elongation of the cushion-like shaped body of up to 250% at room temperature, the cushion reverts to its original shape after the end of the loading without undergoing permanent elongation. These outstanding properties also apply to bending and twisting of the cushion. In any event, the original shape is quickly restored after the end of loading.

Surprisingly, the bonding between the silicone enclosure and the polyurethane filling material is outstandingly good, although these materials are usually not very compatible. According to current knowledge, this is attributable to the great softness of the two materials and the almost congruent extension behavior.

According to one aspect of the invention, the soft silicone of the enclosing layer is a liquid silicone rubber (LSR).

As a continuation of the invention, the layer thickness of the silicone enclosure is 0.1 to 0.9 mm and preferably 0.1 to 0.4 mm. With a silicone material of the described softness and tear strength and extensibility, these layer thicknesses are sufficient to achieve the desired effect according to the invention.

The Shore (A) hardness of the silicone enclosure preferably lies between Shore 5A and 40A, more preferably 10A and 40A and more preferably between Shore 20A and Shore 40A. The somewhat higher Shore (A) hardness is used in the case of thinner layer thicknesses, while thicker layer thicknesses can be made with softer liquid silicone rubbers.

The enclosing layer is preferably produced from a liquid silicone rubber (LSR), since this is injection-moldable and therefore particularly suitable for producing thin-walled enclosures. Other silicone compounds, for example RTV silicones (RTV=room temperature crosslinking) are likewise suitable for producing thin-walled silicone enclosures for the shaped body according to the invention on account of their low viscosity and their softness.

The polyurethane is preferably such a polyurethane with an isocyanate index of less than or equal to 80, preferably less than or equal to 60. In a preferred embodiment, the isocyanate-reactive component is present in excess and may behave as a disperse gel phase. The gel character of the preferred polyurethane gel therefore comes about by working with low characteristic values (isocyanate index).

The polyurethane gel preferably consists of reaction products of polyether polyols and polyisocyanates. The mathematical product of the polyol functionality and the isocyanate functionality is preferably at least 5.2, more preferably at least 6.5, very preferably at least 7.5. At the same time, the isocyanate functionality is preferably between 2 and 4.

In particular, it has been found that polyether polyols with functionalities that are greater than 3 and have hydroxyl values that are less than 60 provide gels that have a particularly pleasing feel in combination with isocyanates of a functionality that is greater than 3.

Aliphatic, cycloaliphatic and aromatic isocyanates, which should be at least difunctional, may be used. The use of chain extenders, crosslinking agents and polyols with hydroxyl values greater than 60 is possible and can be used for modifying properties of the resultant gel, as is usual in other applications of the polyurethane industry.

The polyurethanes used according to the invention are non-chemically foamed and have a density greater than or equal to 500 grams per liter and more preferably less than or equal to 1200 grams per liter. Low amounts of gas or air may be introduced into the polyurethane material, for example by impact ("physical foaming"), although the aforementioned density limits should be maintained.

In the case of the cushion according to the invention, the thin silicone enclosing layer and the filling interact, the dimensions of the cushion generally being such that the cushion filling is at least 3 mm thick in most regions. This means that the filling, which is mechanically of some importance, should not be made too thin. The greatest or widest cross section in any direction should therefore be at least 3 mm, preferably at least 5 mm.

In some preferred embodiments, the enclosure is formed almost completely by the enclosing layer of thin silicone, it being possible for the enclosing layer to have an opening that is optionally closed with a material other than the soft silicone. The opening may be closed by a sealing, preferably of the material of the silicone enclosing layer, or a closure.

The opening with the closure or cast plug is primarily required if the enclosing layer is formed first, for example cast or sprayed into a mold, and is then filled with the filling. Instead of the closure, it is also possible to use a component element, on which the filling and the enclosing layer are then integrally formed. The enclosing layer and the plug or closure or component element form the complete enclosure for the filling.

According to a further aspect, the opening of the enclosure may be left open, if for example the tackiness or adhesiveness of the filling is to be used for an adhesive bond to a component or a person.

As described, the filling may be introduced into the cushion-like shaped body through an opening. After filling, the opening in the enclosure or especially the enclosing layer is then preferably sealed and for example closed with a cast silicone plug, preferably with the silicone material of the enclosing layer, but alternatively also with a hard silicone, which forms a cover or stopper. Generally, a closure or cover or stopper for the opening may consist of any desired material, for example a relatively hard plastic. It may be a closure plate.

In principle, the cushion can be produced in various ways:

According to a first embodiment, the polyurethane gel, in a state prior to complete full polymerization, is filled into a prefabricated silicone enclosure. This may involve the polyurethane gel being processed by spraying, pouring, spreading or other techniques. The filling of a separately prefabricated silicone enclosure with polyurethane gel is possible here in just the same way as the filling of a silicone enclosure prefabricated at the same time, for example in a 2-component process. The silicone enclosure to be filled is prefabricated by spraying, pouring, spreading or other techniques, but preferably by the injection-molding process. The filling opening in the silicone enclosure filled with polyurethane gel may if necessary be sealed after the full polymerization of the polyurethane gel. The sealing is preferably performed with a silicone, which is applied to the filling opening by spraying, pouring, spreading or other techniques. The bonding of the silicone enclosure, polyurethane gel and sealing layer may be strengthened by the use of an adhesion promoter.

According to a further exemplary embodiment, the polyurethane gel is prefabricated by means of a shaping device. The prefabricated polyurethane gel body is enclosed with a silicone enclosure after full polymerization. The silicone enclosure may enclose the polyurethane gel body partly or completely. The polyurethane gel body may be enclosed with a silicone enclosure immediately after full polymerization or at another time. The bonding of the silicone enclosure, polyurethane gel and silicone sealing layer may be strengthened by the use of an adhesion promoter.

The object of the invention is finally also achieved by the use of the cushion-like shaped body according to the invention for pads, shape-compensating elements, grips, saddles, cushions, erotic articles, seals, mattresses and vibration dampers. Therefore, corresponding components or articles that are equipped with a cushion-like shaped body according to the invention belong to the invention.

The invention is explained in more detail below on the basis of exemplary embodiments and material tests, which are intended to serve for purely illustrative purposes. The invention described generally in the foregoing description is not restricted by the examples. Rather, they serve a person skilled in the art for illustrating further possibilities for embodiment within the scope of the invention.

DESCRIPTION OF THE DRAWINGS

In the drawings:

FIGS. 4-17 show schematic sectional representations and views of various embodiments, specifically:

DETAILED DESCRIPTION

Tests on Test Pieces

Producing the Test Pieces for the Extension Tests:

A first silicone film is placed onto a planar surface area and a frame with inside dimensions of 100 mm in length, 50 mm in width and 10 mm in height is placed onto the film. This frame is filled with polyurethane gel. A second silicone film is rolled onto the gel. The second silicone film 2 is weighed down with a planar cover. After the full polymerization of the gel, the frame is removed and the protruding silicone film is trimmed. This produces cuboidal test specimens with dimensions of 100×50×(10.4 to 10.6) mm. The thickness of the first and second silicone films was 0.25±0.05 mm.

A total of three test pieces were produced by the method described above.

Silicone Material Used for the Extension Test Pieces:

Silicone films of ELASTOSIL® from WACKER Chemie AG of three different Shore (A) hardnesses were used.

ELASTOSIL® 3003/05; Shore A 5
    modulus of elasticity 0.12 N/mm$^2$—according to the manufacturer ELASTOSIL® 3003/10; Shore A 10
    modulus of elasticity 0.13 N/mm$^2$—according to the manufacturer ELASTOSIL® 3003/40; Shore A 40
    modulus of elasticity 0.20 N/mm$^2$—according to the manufacturer The silicone films had in each case a thickness of about 0.25 mm.

Gel Used for the Extension Test Pieces:

Polyaddition product of a trifunctional polyether polyol with a hydroxyl value of 30, with a viscosity of 1000 mPas and a tetrafunctional HDI prepolymer with an NCO content of 6% by weight, with a viscosity of 3000 mPas.

The resultant Shore (000) hardness of the gel was 8.

The determination of the Shore hardness is described in ASTM D2240-05 (2010). Equipment and methods are also specified in DIN ISO 868:2003E.

Extension Test Pieces Produced with the Aforementioned Materials:

No. 1 Combination of gel and silicone films of ELASTO-SIL® 3003/05, hereafter referred to as "extension test piece 3003/05"

No. 2 Combination of gel and silicone films of ELASTO-SIL® 3003/10, hereafter referred to as "extension test piece 3003/10"

No. 3 Combination of gel and silicone films of ELASTO-SIL® 3003/40, hereafter referred to as "extension test piece 3003/40"

1. Extension Test

The extension tests were performed on test pieces especially produced for this purpose (extension test pieces). The behavior of the extension test pieces under tensile loading was examined. For this purpose, the test pieces were clamped in a universal testing machine (the Test company).

Figure 1:
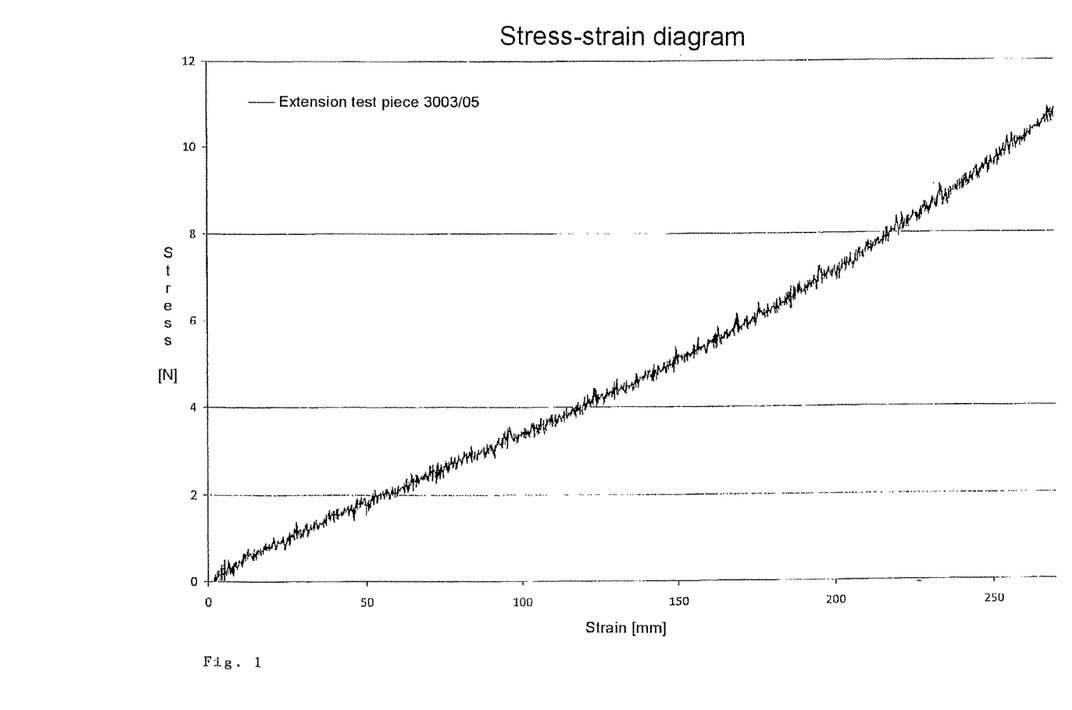
FIG. 1 shows a stress-strain diagram for extension test piece 3003/05, specimen 1
Figure 2:
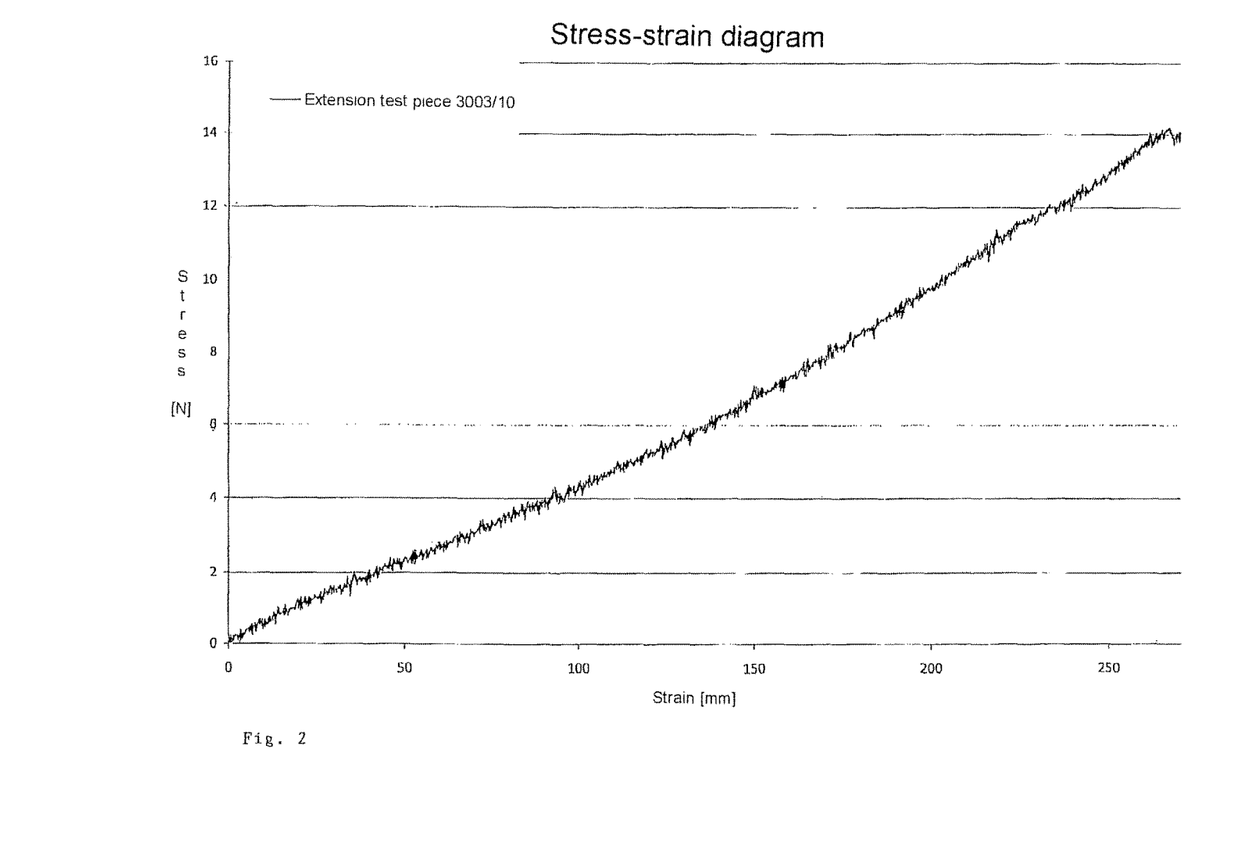
FIG. 2 shows a stress-strain diagram for extension test piece 3003/10, specimen 2
Figure 3:
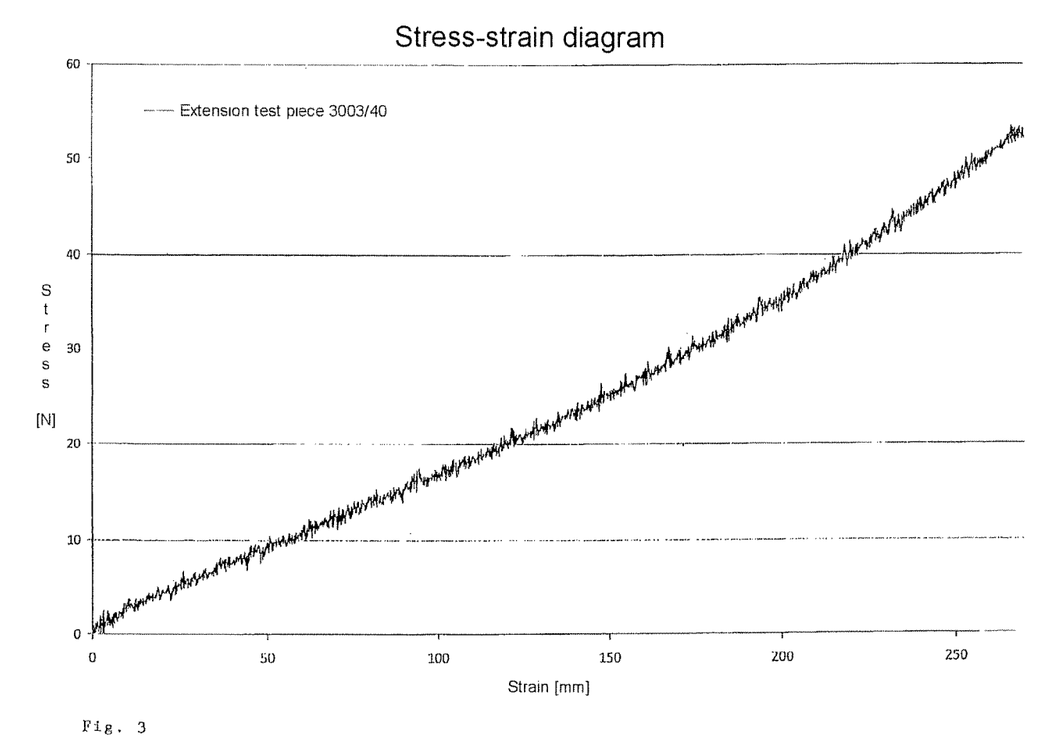
FIG. 3 shows a stress-strain diagram for extension test piece 3003/40, specimen 3

The distance between the jaws of the testing machine was 90 mm. The specimen was subsequently extended to a length of 360 mm, i.e. the distance traveled was 270 mm and there was an elongation of 300%. The advancement here was 150 mm per minute, the holding time at 300% elongation was 15 seconds, the return rate was 300 mm per minute. In this process, the necessary deflecting stress was determined in relation to the strain and recorded. The associated diagrams can be taken from FIGS. 1 to 3. During the extending process, the behavior of the test piece was observed, in particular the phase transition from gel to silicone skin. The extension of the test pieces was examined once again after the tensile test for possible phase separations. The change in length of the extension test pieces was measured.

Evaluation of the Extension Tests:

A linear dependence of the deflecting stress in relation to the strain (FIGS. 1-3) was found for all the test pieces. With the inclusion of the cross-sectional area of the test pieces, the moduli of elasticity can be derived.

2. Moduli of Elasticity (Tensile Stress [N/mm$^2$] at 300% Elongation)

The following moduli of elongation were determined from the extension tests:

Extension test piece 3003/05=0.011 N/mm$^2$=11 kPa
Extension test piece 3003/10=0.014 N/mm$^2$=14 kPa
Extension test piece 3003/40=0.054 N/mm$^2$=54 kPa Almost no plastic deformation of the test pieces could be found. All of the extension test pieces reverted to their original geometry after the end of the loading. No lasting change in length was found. The very low moduli of elasticity determined characterize the enormous softness of the overall gel-silicone system.

No separation of the gel and silicone film under tensile loading was observed. All of the test pieces had no visual changes during the tensile test and after the end of the loading.

Test Parameters:

distance between clamping jaws 90 mm, clear width advancement 150 mm/min up to a maximum length of 270 mm (300% elongation with respect to the test length)

maximum holding time 15 seconds return 300 mm/min.

3. Compression Set

A total of four test pieces were produced for the determination of the compression set (CS), two gel bodies without a coating and two gel bodies with a silicone film coating.

To prepare the gel bodies without a coating, the gel was poured into a polyethylene mold before complete full polymerization and was fully polymerized. This produced a cuboidal gel body with dimensions of length=50 mm, width=50 mm and height=25 mm, which could be removed from the polyethylene mold.

To prepare the gel bodies with a coating, the gel was poured into a prefabricated silicone film. The gel body thus produced was coated with a silicone film on five of six sides after full polymerization. This cuboidal gel body had the dimensions of length=50 mm, width 50 mm and height equal to 25 mm. The only uncoated surface had side lengths of 50 mm×50 mm.

Gel Used for CS Test Pieces:

Polyaddition product of a trifunctional polyether polyol with a hydroxyl value of 30, with a viscosity of 1000 mPas and a tetrafunctional HDI prepolymer with an NCO content of 6% by weight, with a viscosity of 3000 mPas.

The resultant Shore (000) hardness of the gel was 8.

Silicone Film Used for the CS Test Pieces:

Prefabricated silicone films of ELASTOSIL® 3003/10 with a Shore A hardness of 10 from WACKER Chemie AG were used. For this purpose, silicone films 0.2 to 0.3 mm thick were cast, producing in the filled state a cuboidal body with side lengths of 50 mm, 50 mm and 25 mm. The silicone film thereby formed five faces of a cuboid. The face that is not depicted had side lengths of 50 mm and 50 mm.

CS test pieces produced with the aforementioned materials (gel, silicone):

A Gel body 50×50×25 mm (L×W×H) without coating, hereafter referred to as "test piece A"

B Gel body 50×50×25 mm (L×W×H) with silicone film coating on five sides, hereafter referred to as "test piece B"

Two specimens of each of test pieces A and B were produced, referred to as A1, A2, B1, B2.

CS Test:

The compression set of the four test pieces was determined. For this purpose, measurements and evaluations were carried out on the basis of DIN EN ISO 1856:2008-01. The conditions of the ISO standard, Clauses 7.2 and 7.3, are thereby satisfied.

All of test pieces A and B were respectively compressed between two steel plates to 50% of the original height, that is to say to 12.5 mm. One of test pieces A and B respectively were compressed at 25° C., the other two at 70° C., for 22 hours. Subsequently, the height of all four test pieces was determined after 30 minutes, 7 hours and 72 hours. See the following tables.

| A1: test piece A - 25° C. |
|---|
| CS [%] - after 30 min CS = 6 |
| CS [%] - after 7 h CS = 6 |
| CS [%] - after 72 h CS = 5 |

A2: test piece A - 70° C.

CS [%] - after 30 min CS = 13
CS [%] - after 7 h CS = 12
CS [%] - after 72 h CS = 9

B1: test piece B - 25° C.

CS [%] - after 30 min CS = 5
CS [%] - after 7 h CS = 3
CS [%] - after 72 h CS = 1

B2: test piece B - 70° C.

CS [%] - after 30 min CS = 5
CS [%] - after 7 h CS = 5
CS [%] - after 72 h CS = 4

The calculation of the CS was performed in accordance with the formula:

$$CS = (d_0 - d_r)/d_0 \times 100$$

$d_0$ = original thickness of the test piece
$d_r$ = thickness of the test piece after recovery Evaluation of the CS Test:

It has surprisingly been found that the in any case already very good recovery of the gel is further improved by the silicone enclosure. The compression set of test pieces B is always better than the compression set of test pieces A.

DESCRIPTION OF THE EXEMPLARY EMBODIMENTS OF THE CUSHION

Figure 4:
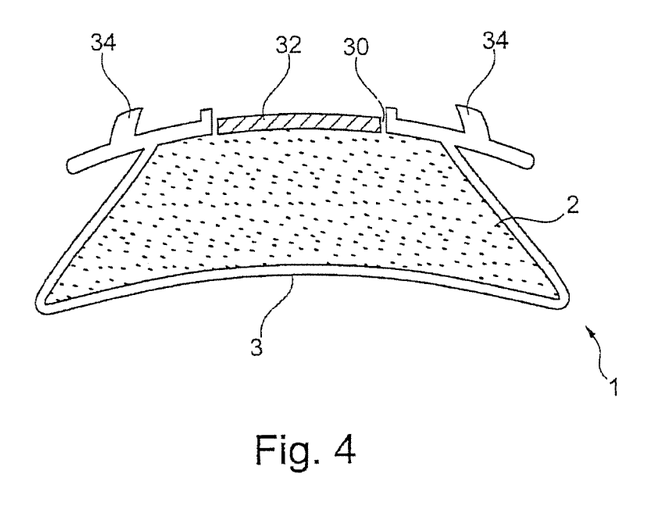
FIG. 4 a forehead pad of a mask, cross section

FIG. 4 shows a forehead pad for a mask. The cushion-like shaped body 1 consists of a completely enclosed filling 2, which is in full surface-area contact with the elements enclosing it. These consist of the actual enclosing layer 3 of soft silicone, the fastening elements 34 integrally formed thereon and the plug 32, which closes the opening 30. With the fastening elements 34, the forehead pad is secured to a mask that is not represented here. As a result of its good extensibility and mobility and also compressibility, the forehead pad offers a high degree of wearing comfort. The filling 2 and the enclosing layer 3 behave completely as one. The enclosing layer does not crease or crinkle at any point in time or under any loading.

Figure 5:
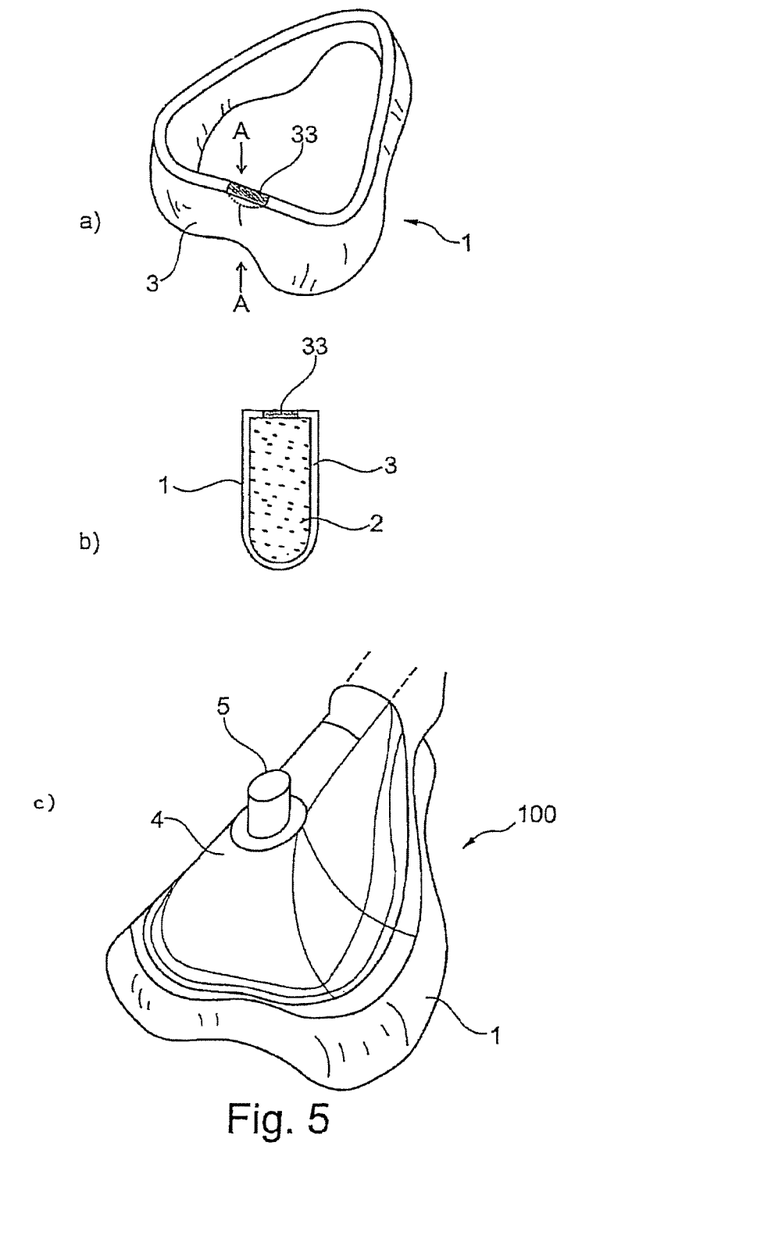
FIG. 5 an accident, anesthesia or general respiratory mask, a) in perspective, b) cross section at A-A, c) perspective view with upper mask part FIG. 6 a lumbar pad FIG. 7 a head cushion with neck support FIG. 8 a bicycle saddle FIG. 9 a head restraint

FIG. 5 shows a further example of an application for the cushion-like shaped body 1 as a seal on a respiratory mask 100. FIG. 5a) shows a perspective view of the seal comprising the shaped body 1, which consists of a soft elastic polyurethane gel body 2 and a soft silicone enclosing layer 3 completely surrounding the gel body. The enclosing layer 3 is closed with a cast plug 33. FIG. 5b) shows a schematic cross-sectional view of the shaped body 1 from FIG. 5a), taken in section at position A-A. In FIG. 5c), the cushion-like shaped body 1 acting as a seal with respect to the user's face sits stably on a respiratory mask shell 4 with a gas exchange attachment 5, both of hard plastic. The sealing cushion 1 is formed as a peripheral lip on the border of the respiratory mask shell 4. In no extension or compression position is the enclosing shell 3 detached from the filling 2; the two move in complete conformity. Even when there are sudden changes in shape—if for example the respiratory mask 100 has to be quickly pressed onto the user's face—no creases or cavities can be formed between the filling 2 and the enclosing layer 3.

Figure 6:
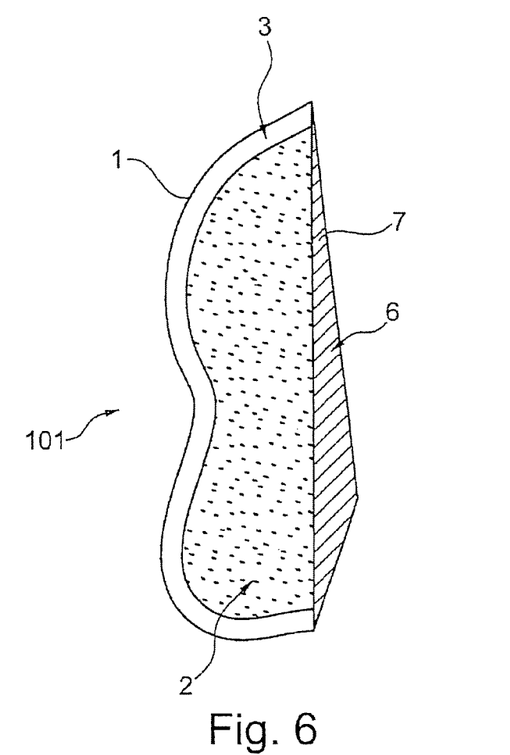

FIG. 6 shows a lumbar pad, denoted as a whole by 101. This substantially consists of the cushion-like shaped body 1, which forms the actual pad. The pad in turn consists of the polyurethane gel filling 2 in a silicone enclosing layer 3, which here only partially surrounds the filling 2. The lumbar pad 101 is closed on one side by a hard component 6, which introduces a supporting function. The hard component 6 is formed from hard plastic. By contrast with FIG. 4, where a filling 2 that is enclosed almost completely by the silicone enclosure 3 was shown, here the enclosing layer 3 has a large opening, which is closed with the aid of the hard component 6. The surface area 7 of the filling directly adjoins the hard component 6, so that the filling 2 as a whole is completely enclosed by the enclosing layer 3 and the hard component 6 acting with respect thereto as a base or covering. The component 6 and the enclosing layer 3 together form the enclosure of the filling 2 that is directly in contact with the elastic filling material. A flat cushion is produced, of a very rigid form on one side of the cushion that is facing away from the body of a user.

Figure 7:
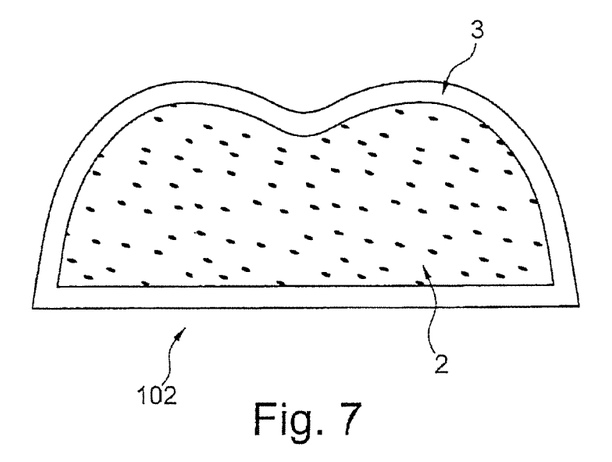

FIG. 7 shows a cushion 102 in the form of a head cushion with a neck support. The cushion is in turn schematically shown in cross section. The filling of a soft elastic polyurethane gel 2 is completely surrounded by an enclosing layer 3 of silicone. In the case of such a cushion, the filling 2 is relatively thick. Stresses of the filling material and the enclosure 3 may be produced by compressive loading, by extension, but also by twisting or creasing of the cushion. Even under great stresses of this kind, the cushion does not undergo any permanent change. For the production of such a cushion 102, either a dimensionally stable gel body may be produced and completely encapsulated or sprayed with the silicone for the enclosure 3, or the enclosure 3 is produced first, and then has an opening that is not represented in the figure and is subsequently filled with the gel for the filling 2. The silicone enclosure 3 may be subsequently closed with a cast silicone plug.

Figure 8:
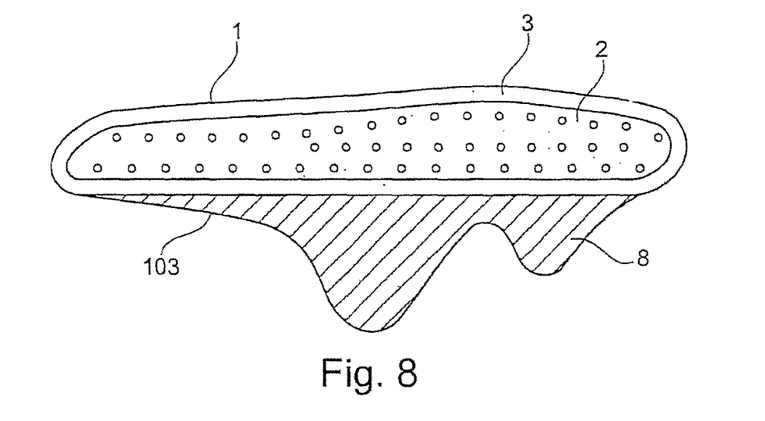

FIG. 8 shows a bicycle saddle 103, in the case of which the saddle pad consists of the cushion-like shaped body 1, which in turn is made up of the gel filling 2 and the silicone enclosure 3. The silicone enclosing layer 3 completely surrounds the elastic polyurethane filling 2. The cushion body comprising the shaped body 1 is supported by a carrier 8, which can be fastened on a seat post in the usual way with mechanical aids by way of a possibly sprung saddle support.

Figure 9:
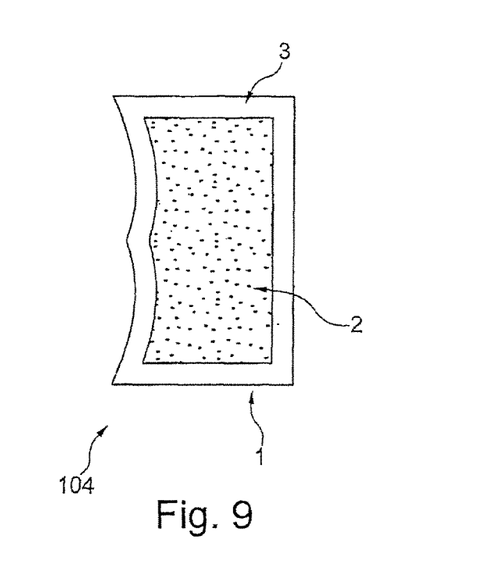

FIG. 9 shows the cross section of a head restraint, such as may be provided for a motor vehicle seat, an office chair, an armchair, a wheelchair or the like. The head restraint 104 consists of a cushion-like shaped body 1 with the cross section shown and is either fastened to a holder not represented any more specifically here or is adhesively attached to an additional head restraint part (not represented).

Figure 10:
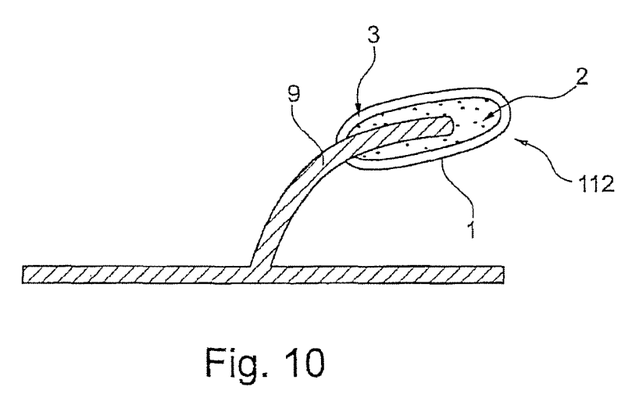
FIG. 10 a grip

FIG. 10 shows a grip 112 comprising the cushion-like shaped body 1 that is fastened to the end of a hard dimensionally stable grip holder 9. The grip holder 9 protrudes into the shaped body 1 and is enclosed by the enclosing layer 3. The filling 2 thereby fills the enclosure comprising the grip holder 9 and the enclosing layer 3 in such a way that the end of the holder is completely encased by the padding filling 2.

Figure 11:
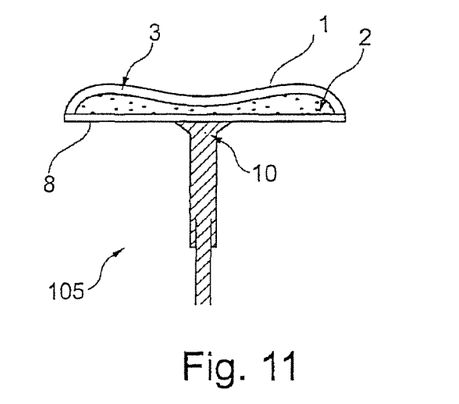
FIG. 11 an armrest

FIG. 11 shows an armrest 105, in the case of which the shaped body 1 is formed on a flat rigid carrier 8, in that the filling 2 is completely enclosed by this carrier 8 on the one hand and the enclosure 3 on the other hand. The carrier 8 sits on an adjustable support 10, for example an arm support for an office chair.

Figure 12:
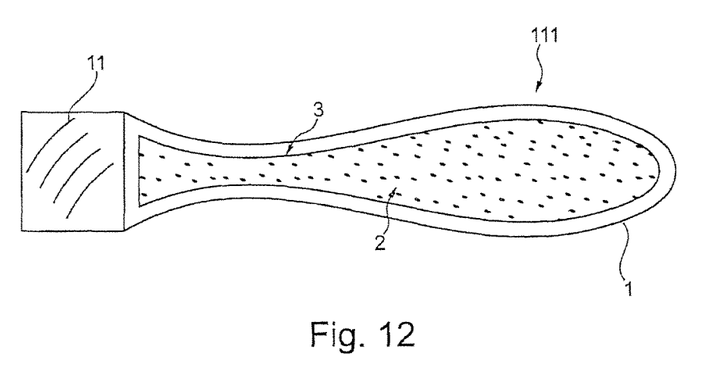
FIGS. 12 and 13 erotic articles
Figure 13:
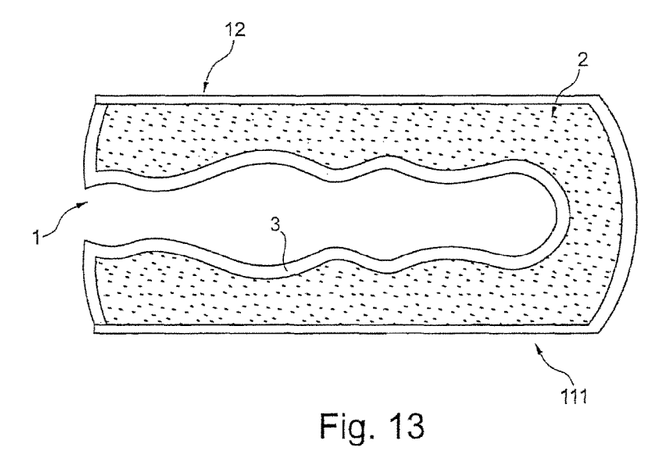

FIGS. 12 and 13 show erotic articles. FIG. 12 has a cushion-like shaped body 1 that is elongated in the form of a rod and in this example is completely surrounded by the silicone enclosing layer 3. The shaped body 1 is fastened to a base part 11 by way of the enclosing layer 3. By contrast, the erotic article that is shown in FIG. 13 has a substantially dimensionally stable outer enclosure 12, which stabilizes the shape of the cushion-like shaped body 1 inside this enclosure 12.

Figure 14:
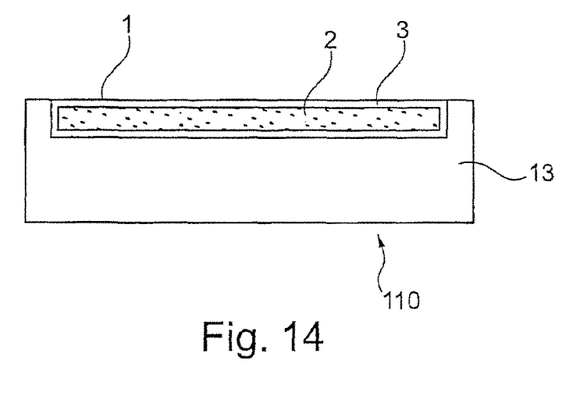
FIG. 14 a mattress

FIG. 14 shows a mattress 110, in turn in a schematic cross-sectional view, in which the cushion-like shaped body 1 is formed as a flat overlay on a mattress foam body 13. The shaped body is recessed on one of the surfaces of the foam body 13 and thus finishes flush with the surface of the mattress 110.

Figure 15:
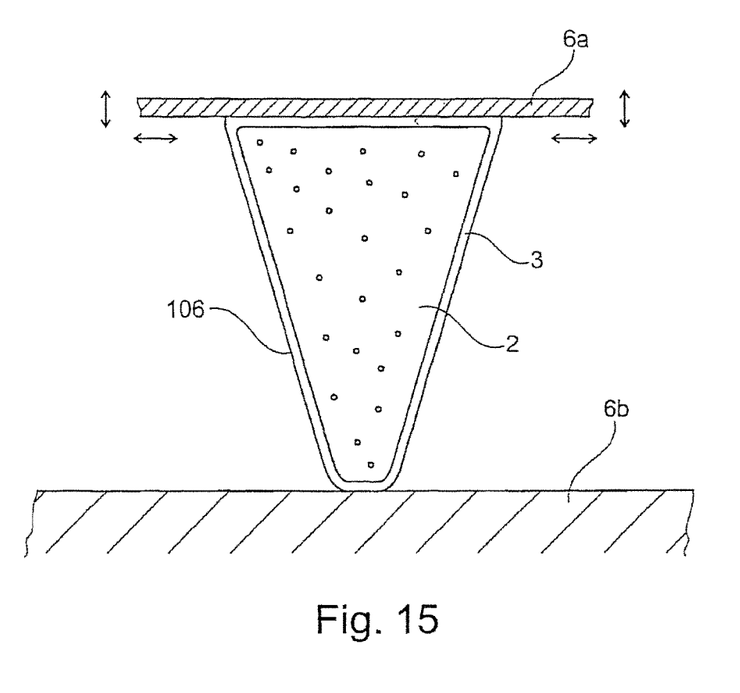
FIG. 15 a vibration damper

FIG. 15 shows a wedge-shaped vibration damper 106, which is arranged between two hard components 6a and 6b, in order to damp vibrations of the hard component 6a that are indicated by arrows.

Figure 16:
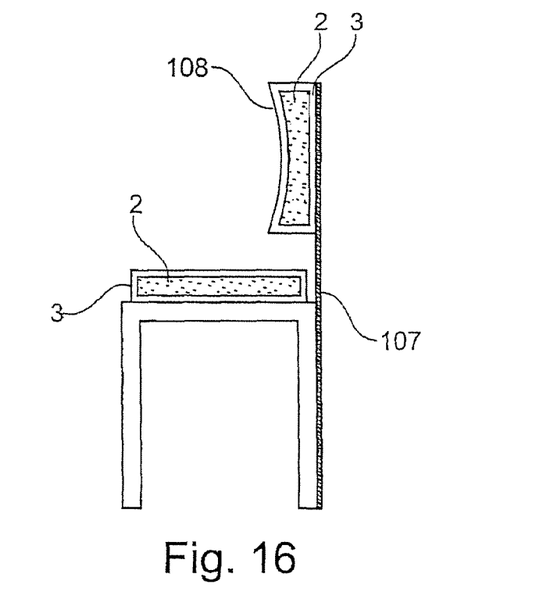
FIG. 16 chair upholstery

FIG. 16 shows chair upholstery consisting of a chair seat cushion 107 and a backrest pad 108. Great extensions may occur here, particularly at the front edge of the chair, but cannot cause the seat cushion 107 to lose it shape. In spite of its softness and elasticity, the cushion-like shaped body of the seat cushion 107 and of the backrest pad 108 is in any event dimensionally stable and freely moldable, so that for example the contour of the backrest pad 108 that is represented in the figure is repeatedly resumed.

Figure 17:
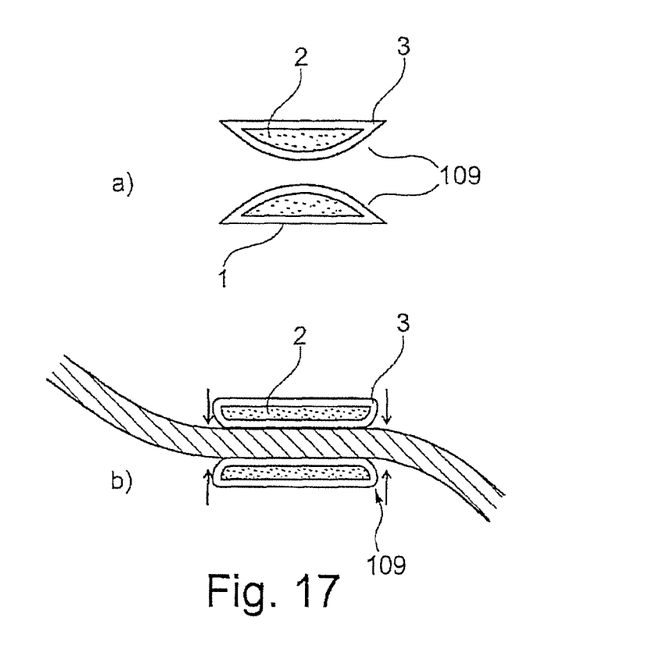
FIG. 17 a seal, a) in the unloaded state, b) in the sealing state.

FIG. 17 shows a schematic diagram of an annular seal, to be precise in the unloaded position in FIG. 17a and in the sealing position in FIG. 17b, here around a cable. The seal consists exclusively of the cushion-like shaped body 1, which is of an annular form here and in the case of which the silicone enclosing layer 3 completely encloses the polyurethane gel of the filling 2. In the unloaded state 16a, the sealing cushion 109 is convexly curved toward the center of the ring and, during sealing, is compressed so as to form a flat ring. As a result of the great mobility of the filling and the enclosure, no leakages can occur. The sealing cushion 109 follows the contour of the cable at every point.

The foregoing description is intended to illustrate the various possibilities for use of the cushion-like shaped body according to the invention. Numerous other applications in which the shaped body may be used as a sealing pad, shape-compensating material and the like can be described.

LIST OF DESIGNATIONS

1 Cushion-like shaped body
2 Filling of gel
3 Enclosing layer of silicone
4 Respiratory mask shell
5 Gas exchange attachment of a respiratory mask
6 Hard component
7 Surface area
8 Carrier
9 Grip holder
10 Support
11 Base part
12 Outer enclosure
13 Mattress foam body
30 Opening in the silicone enclosure
32 Plug
33 Cast plug
34 Fastening elements
100 Respiratory mask
101 Lumbar pad
102 Cushion
103 Bicycle saddle
104 Head restraint
105 Armrest
106 Vibration damper
107 Chair seat cushion
108 Backrest pad
109 Seal
110 Mattress
111 Erotic article
112 Grip

The invention claimed is:

1. A cushion-like shaped body comprising an elastic, gel-like adhesive polyurethane filling in a prefabricated silicone enclosure,
   wherein the adhesive polyurethane filling fills the enclosure and has an isocyanate index of less than or equal to 80, a Shore (000) hardness of less than or equal to 80, and a compression set of less than or equal to 14%,
   wherein the adhesive polyurethane filling is a reaction product of a polyisocyanate with a functionality greater than 3 and a polyetherpolyol with a functionality greater than 3 and a hydroxyl value less than 60,
   wherein the prefabricated silicone enclosure is formed from a soft silicone with a thickness of 0.075 mm to 1 mm, and with a Shore (A) hardness of between 3 A and 45 A,
   wherein the prefabricated silicone enclosure is highly extensible and highly elastic with an ultimate elongation value of not less than 400% and has a tensile stress at an elongation of 250% of at least 0.5 N/mm$^2$,
   wherein an inside surface of the prefabricated silicone enclosure is in direct contact over its full surface area with the adhesive polyurethane filling,
   wherein an extensibility of the adhesive polyurethane filling is greater than or equal to the extensibility of the prefabricated silicone enclosure, and
   wherein the cushion-like shaped body reverts with no detachments at an interface of the adhesive polyurethane filling and the inside surface of the prefabricated silicone enclosure to an original shape without undergoing permanent elongation under mechanical loading with a tensile elongation of 250% at room temperature.

2. The cushion-like shaped body as claimed in claim 1, wherein the soft silicone is a liquid silicone rubber (LSR).

3. The cushion-like shaped body as claimed in claim 1, wherein the thickness of the prefabricated silicone enclosure is 0.1 mm to 0.9 mm.

4. The cushion-like shaped body as claimed in claim 3, wherein the thickness of the prefabricated silicone enclosure is 0.1 mm to 0.4 mm.

5. The cushion-like shaped body as claimed in claim 1, wherein the Shore (A) hardness of the prefabricated silicone enclosure is between 5 A and 40 A.

6. The cushion-like shaped body as claimed in claim 5, wherein the Shore (A) hardness of the prefabricated silicone enclosure is between 20 A and 40 A.

7. The cushion-like shaped body as claimed in claim 1, wherein the prefabricated silicone enclosure has an opening that is closed by a sealing or a closure.

8. The cushion-like shaped body as claimed in claim 1, wherein the adhesive polyurethane filling has an isocyanate index of less than or equal to 60.

9. The cushion-like shaped body as claimed in claim 1 wherein the prefabricated silicone enclosure is highly extensible with an ultimate elongation value of at least 500%.

10. A component or article, equipped with the cushion-like shaped body as claimed in claim 1, wherein the component or article is selected from the group consisting of a pad, seal, shape-compensating element, bicycle handle bar grip, saddle, cushion, erotic article, mattress and vibration damper.

11. The component or article as claimed in claim 10, further comprising fastening or holding elements integrally formed, on the prefabricated silicone enclosure.

12. The component or article as claimed in claim 11, wherein fastening or holding elements are molded on the prefabricated silicone enclosure.

* * * * *